May 18, 1965  E. J. DIEBOLD  3,184,646
HIGH VOLTAGE RECTIFIER STACK
Filed June 6, 1960  5 Sheets-Sheet 1
FIG. 1.
FIG. 3.
FIG. 2.
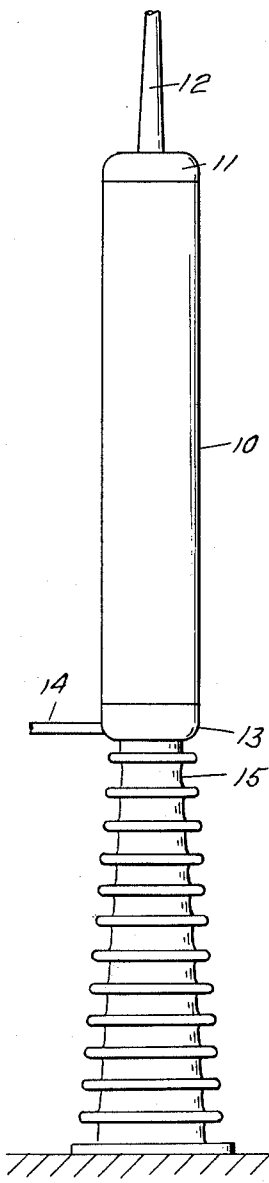
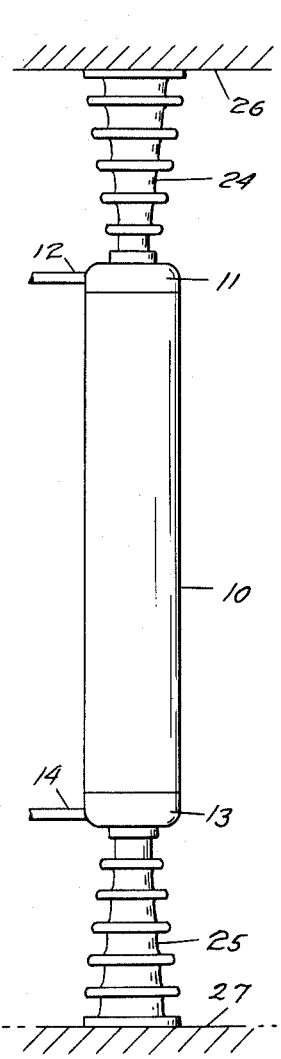
INVENTOR.
EDWARD J. DIEBOLD
BY
OSTROLENK, FABER, GERB & SOFFEN
ATTORNEYS May 18, 1965   E. J. DIEBOLD   3,184,646
HIGH VOLTAGE RECTIFIER STACK
Filed June 6, 1960   5 Sheets-Sheet 2

INVENTOR.
EDWARD J. DIEBOLD
BY
OSTROLENK, FABER, GERB & SOFFEN
ATTORNEYS

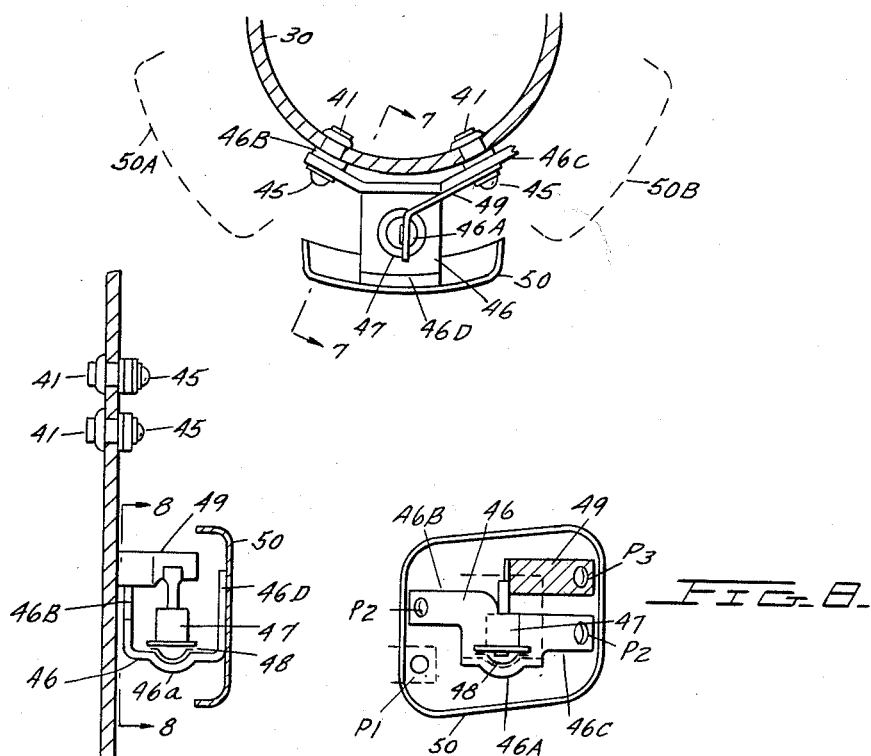
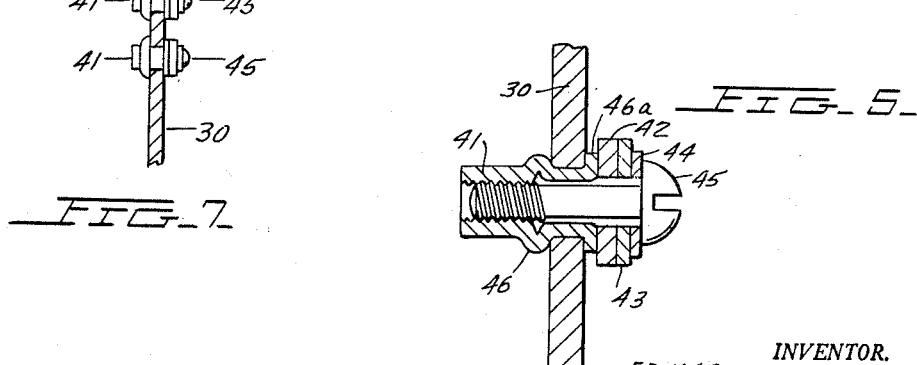

May 18, 1965　　　E. J. DIEBOLD　　　3,184,646
HIGH VOLTAGE RECTIFIER STACK
Filed June 6, 1960　　　　　　　　　　　　5 Sheets-Sheet 4
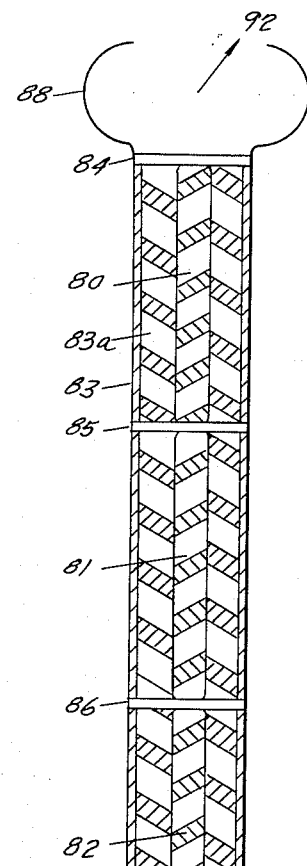
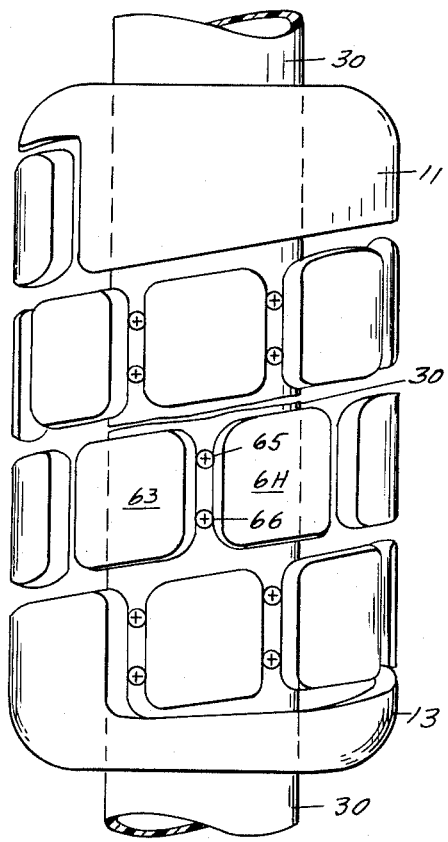
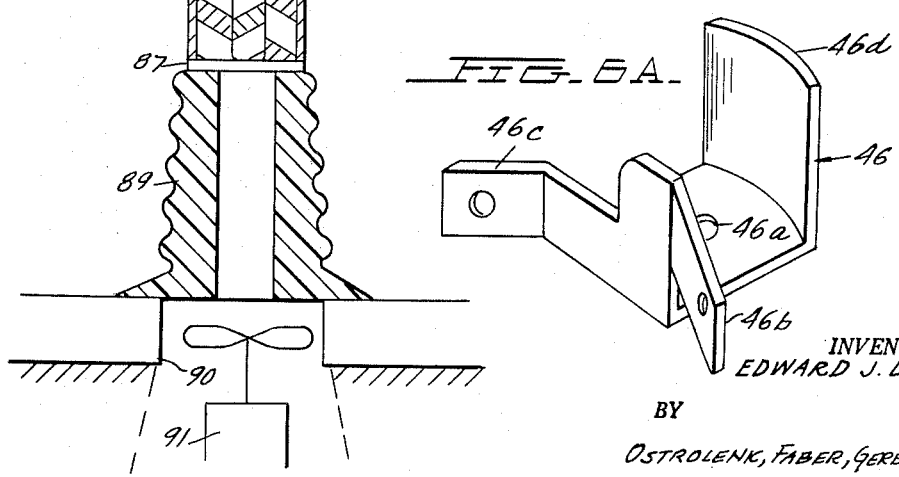
INVENTOR.
EDWARD J. DIEBOLD
BY
OSTROLENK, FABER, GERB & SOFFEN
ATTORNEYS May 18, 1965 E. J. DIEBOLD 3,184,646
HIGH VOLTAGE RECTIFIER STACK
Filed June 6, 1960 5 Sheets-Sheet 5
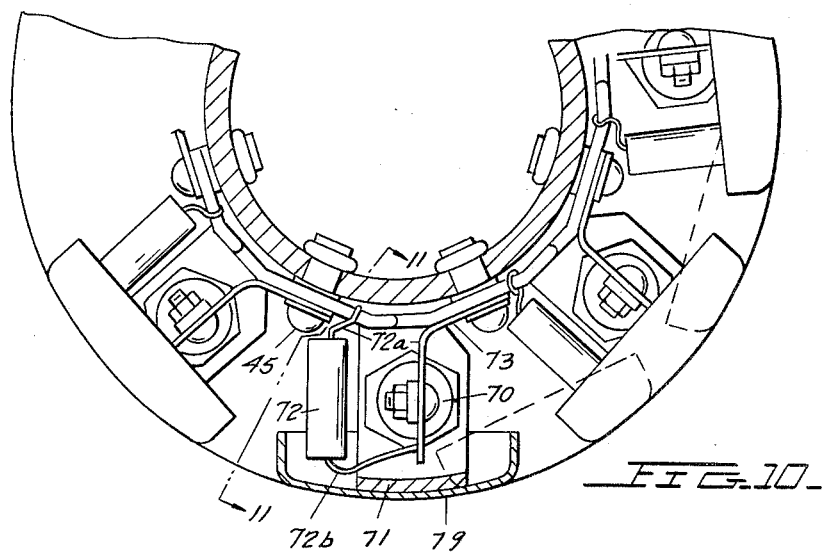
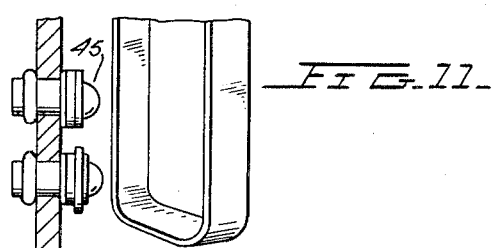
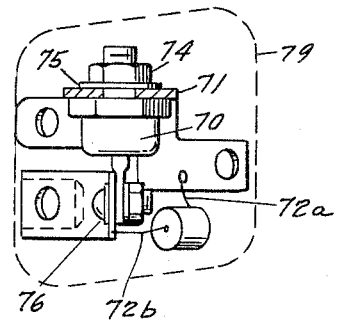
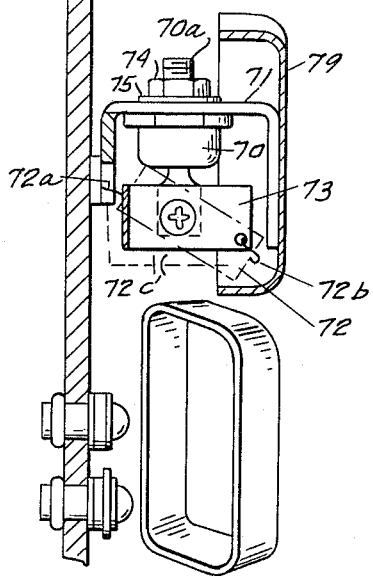
INVENTOR.
EDWARD J. DIEBOLD
BY
OSTROLENK, FABER, GERB & SOFFEN
ATTORNEYS

United States Patent Office 3,184,646
Patented May 18, 1965

3,184,646
HIGH VOLTAGE RECTIFIER STACK
Edward John Diebold, Palos Verdes Estates, Calif., assignor to International Rectifier Corporation, El Segundo, Calif., a corporation of California
Filed June 6, 1960, Ser. No. 34,191
18 Claims. (Cl. 317—101)

This invention relates to a high voltage rectifier stack which is comprised of a plurality of series connected cells or sub-groups of cells, and more specifically relates to a novel mounting structure for the individual cells and a novel means for supporting the complete stack.

Rectifier cells of the germanium, selenium, and silicon type where any individual cell may have a substantial voltage blocking capacity as well as a high current capacity when well cooled are well known in the art. Theoretically, therefore, it is possible to connect a plurality of individual cells in series to achieve a rectifying assembly which is capable of carrying substantial current at extremely high voltages.

One major problem in the design and manufacture of such high voltage, high power rectifier stacks lies in the fastening of the stack to a support. Thus, each element in the unit is subjected to given A.-C. and D.-C. component voltages. These voltages can be separated into the voltage appearing between the terminal electrodes of each cell or sub-group of cells, and the voltages appearing between the terminal electrodes and the support of the complete stack.

The voltages between the terminal electrodes of the rectifier cells or sub-group of cells within the unit are usually equal in magnitude, although displaced in phase angle. However, the voltages appearing between the electrodes of the cells and the support of the complete unit are usually different in magnitude and in composition of A.-C. and D.-C. components and in phase displacement.

Furthermore, the voltages appearing between the terminal electrodes of the individual cells are usually determined exactly by the supply voltage, whereas the voltage between these electrodes and the support for the complete unit will vary subject to switching transients and other violent variations during the operation of the entire rectifier unit.

Because of the nature of the voltage which may appear between the overall unit and its support, one of the great dangers in the use of such a device is the possibility of an electrical discharge from the rectifier unit to the support, such as direct sparking through an open gap, creepage along insulated surfaces or corona discharges between conductive parts. Because of this, it has been the practice to provide a very high insulating level between all of the various electrodes of the unit and the support structure where this insulating level must be much higher than that existing between adjacent terminal electrodes within the stack.

In accordance with the present invention the complete rectifier stack is constructed to be self-contained and self-supporting to fit between two terminal electrodes where the entire stack acts like a single electrode with respect to the external supporting structure.

In achieving this, each individual device within the stack shields the next adjacent member whereby all of the devices are integrated with the terminal electrodes to form an electrically compact and unbroken unit.

Within the stack itself the only insulation required is that required by the voltage appearing between the terminal electrodes and sub-divisions of this voltage as appear between individual cells or sub-groups of cells. This is accomplished in the novel mannel to be described hereinafter. The entire rectifier assembly or unit then acts as a single electrode with respect to ground support members so that support means for carrying the rectifier unit from the support structure is carried on insulating supports which are provided with an insulating level which is entirely different and much higher than the insulating level within the rectifier structure of the stack. For this purpose, however, the insulating member for carrying the stack can be of a standard construction which is well adapted for insulating between two points of very high potential.

A further major problem which has existed in the construction of high voltage, high power rectifier units lies in the equal distribution of voltage between the various rectifier elements or cells connected in series within the stack. If a great number of devices are used and the voltage distribution between them is not equal, there will be a failure of the stack which is initiated by a partial breakdown of one of the devices followed by a successive breakdown of the other individual devices.

A major reason for such partial over-voltages on a single rectifier cell within the stack is that localized voltage stresses exist between the support member which carries the individual cells to other cells. In addition to causing a break-down of certain of the rectifier elements, an improper or unbalanced voltage distribution within the stack can also initiate localized electric discharges, localized corona discharge, and localized surface creepage effects.

There are also inherent differences in reverse voltage for a given reverse current of the various rectifier elements. This can be corrected by the standard use of shunt resistors and capacitors for each cell to force equal voltage distribution. That is to say, the resistors can provide equal voltage distribution for direction voltage components and low frequency A.-C. components, whereas the parallel connected capacitors will provide equal voltage distribution between the series connected elements for high frequency transients and pulse-type voltage phenomena which may exist across the complete stack.

The connection of these parallel resistors and capacitors place mechanical limitations on the manner in which the individual cells can be mounted within the stack so that the problem of voltage distribution within the stack or along the surface of the cell support member is made more complex.

To further complicate the problem, even though capacitive voltage dividers are used across each rectifier device as described above, travelling waves may upset voltage distribution between cells if sudden impedance changes occur within the stack due to changes of geometric inductance and capacitance of the current conducting parts associated with the rectifier devices.

As will be seen, the construction proposed in the instant invention provides a rectifier stack which represents a homogeneous transimssion line in which each rectifying element is located exactly as are all of the other elements so that there are no discontinuities of the transmission line formed by the individual rectifying elements. Thus, travelling waves between the terminal electrodes of the complete stack can progress from one element to the next element through short, massive, positive connections having low inductance, short distances, simple shapes, and are at the same relative distances from one another.

Prior structures attempting to solve the aforementioned problems for the support of the rectifier as well as within the stack itself have often resorted to the use of a surrounding insulating dielectric liquid around the high voltage rectifier stack. These liquids have usually been of the non-inflammable type such as chlorinated hydrocarbons because of the wide indoor use of these devices. Thus, the entire rectifier unit is carried within a hermetically sealed case filled with the dielectric fluid so that good rectifier performance is expected, even though the stack may be poorly designed.

This type of construction requires expensive insulator bushings for bringing external connections through the case, but more important than this, many unexpected break-downs have occurred in such units. An explanation for these break-downs is that the immersion of the rectifier stack in an insulating fluid and a surrounding metallic tank introduces a substantial capacitive effect between the individual rectifying devices and the tank. During the operation of this stack, and while it is subjected to a blocking voltage, a substantial voltage will occur between the terminals of the stack with each rectifying device operating at a different voltage level. Thus, the voltage between each rectifying device and the metallic tank is different. Therefore, when the voltage is changed, different quantities of charge are required for each rectifying device to supply the displacement current in the systematic capacitance between the rectifying device and the tank. The individual devices, which have to operate at a high voltage with respect to the tank, thus require a high displacement current which can be furnished only by the other rectifying devices assuming much higher individual voltages. Therefore, a rectifier stack which is designed to have an equal voltage distribution between rectifying devices when operating in air and without the tank will be subjected to substantial differences in voltages when they operate within the tank whereby break-down of individual selected rectifier cells will occur during voltage transients or high frequency oscillations which cause an unbalance in the voltage distribution due to the systematic capacitances between the individual devices and the tank.

Note that the inequality of the displacement currents is caused by inequality of voltages and not the inequality of capacitances, so that the voltage unbalance is unavoidable when the rectifier stack is designed according to normal parameters. In the present invention, the aforementioned systematic capacitances between the rectifying devices and their surrounding environment is eliminated to a substantial degree.

The concept of the present invention as related to the support of the individual rectifier cells within the stack is to form a number of unitary sub-assemblies, each of which carry a rectifying cell or sub-group of cells, a shunt resistor for static voltage division of the cell, a shunt capacitor for dynamic voltage distribution across the cell, and a metallic structure which acts as the support, cooling fin, electrostatic shield, and capacitor plate with respect to a housing.

An insulating cylinder forms the main support member and receives each of the various sub-assemblies which are to be connected in series as by providing a plurality of threaded holes in predetermined locations along the cylinder for receiving a screw to fasten each sub-assembly to a respective portion of the cylinder. In the preferred embodiment of the invention, it will be seen that one sub-assembly is carried by three screws.

The shape of the sub-assembly is such that neither the fastening means, rectifier or shunting circuitry can act as an electrode with respect to the surrounding environment. The mechanical design of the unitary sub-assembly is such that the electrical circuit is closed by the mounting operation.

The various sub-assemblies are then progressively mounted around the insulating cylinder to form a helix. The individual shields of the plurality of sub-assemblies, when mounted along the helix, form a cylindric, continuous sheild without protrusions or other discontinuities. Therefore, conduction of electric current through the system of sub-assemblies follows the helix through strong, simple mechanical parts having a smooth surface, thus providing a helicoidal transmission line.

The various high voltage insulating problems within the stack which have been described above are eliminated by the helix arrangement of the unitary sub-assemblies so there is a step-by-step progression of voltage along the helix. The insulating distance between the individual turns of the helix is very large. The voltage dividing shunt resistor and capacitor within the individual sub-assemblies provides for a definite voltage division along the helix and between turns of the helix. Thus, the entire stack has a fixed voltage distribution with ample insulating distances provided for these fixed voltages. Voltages between the stack and the support, the stack and the external environment or stack and ground do not appear within the stack itself, and are applied to other external insulators as described heretofore which are designed especially for this purpose.

Accordingly, a primary object of this invention is to provide a novel high voltage, high power rectifier stack.

Another object of this invention is to provide a high voltage, high power rectifier stack capable of being produced by mass production techniques.

Another object of this invention is to provide a high voltage, high power rectifier stack of improved reliability.

A further object of this invention is to form a novel high voltage rectifier assembly which is supported from a support structure by standard insulator devices, and the stack acts as though it were a single electrode with respect to the supporting structure.

Another object of this invention is to permit a simplified assembly of series connected rectifier elements to form a single high voltage stack which is supported with respect to support structure by insulator means to thereby permit a decreased insulation level within the stack.

A further object of this invention is to provide a novel high voltage, high power rectifier stack which is formed of a plurality of individual rectifier elements which are mounted around a helix of an insulating support tube.

Yet a further object of this invention is to provide a novel sub-assembly of a rectifier unit, a shunting resistor and shunting capacitor and metallic support structure which is operable as a cooling fin.

A still further object of my invention is to provide a novel sub-assembly of a rectifier element, a resistor, a capacitor, and a shield.

Yet another object of this invention is to provide a novel simplified support structure for a high voltage rectifier stack which is comprised of a plurality of rectifier sub-assemblies carried to define a helix around a support tube to define a helicoidal transmission line.

These and other objects of my invention will become apparent from the following description when taken in connection with the drawings, in which:

FIGURE 1 is a side plan view which illustrates the manner in which a single rectifier stack formed of a plurality of individual series connected rectifier elements is carried from a support structure and forms a single electrode with respect to the support structure.

FIGURE 2 is similar to FIGURE 1 and illustrates the rectifier stack as being carried at either end by a pair of support insulators.

FIGURE 3 is a side plan view of the external surface of the insulator stack of FIGURES 1 and 2 showing the external electrostatic shield of each of the rectifier sub-assemblies and the helical path followed by the sub-assemblies.

FIGURE 5 is a partial side cross-sectional view taken through the wall of the insulating tube of FIGURE 4 and illustrates the manner in which one of the mounting screws is arranged to mount the various sub-assemblies.

FIGURE 6 is a partial top cross-sectional view through the tube of FIGURE 4, and illustrates a rectifier sub-assembly and the manner in which it is mounted to the tube.

FIGURE 6A is a perspective view of the bracket for supporting the individual sub-assemblies of the stack.

FIGURE 7 is a partial side cross-sectional view of FIGURE 6 when taken across the lines 7—7 in FIGURE 6.

FIGURE 8 is a partial side cross-sectional view of the sub-assembly of FIGURE 7 when taken across the lines 8—8 in FIGURE 7.

FIGURE 9 is a front plan view of the assembled stack and particularly illustrates the manner in which the mounting screws for the sub-assembly shown in FIGURES 6, 7 and 8 are accessible from areas external of the stack.

FIGURE 10 is a partial top cross-sectional view similar to FIGURE 6 for sub-assemblies of a different nature than those shown in FIGURE 6.

FIGURE 11 is a partial side cross-sectional view of FIGURE 8 when taken across the lines 11—11 in FIGURE 10.

FIGURE 12 is a front view of the sub-unit assembly of FIGURE 11 with the electrostatic shield shown in dotted lines.

FIGURE 13 illustrates the manner in which a plurality of stacks of the type shown in FIGURES 3 and 9 may be connected in series for a still higher voltage rectifier unit in connection with a cooling means for the stacks.

Figure 4:
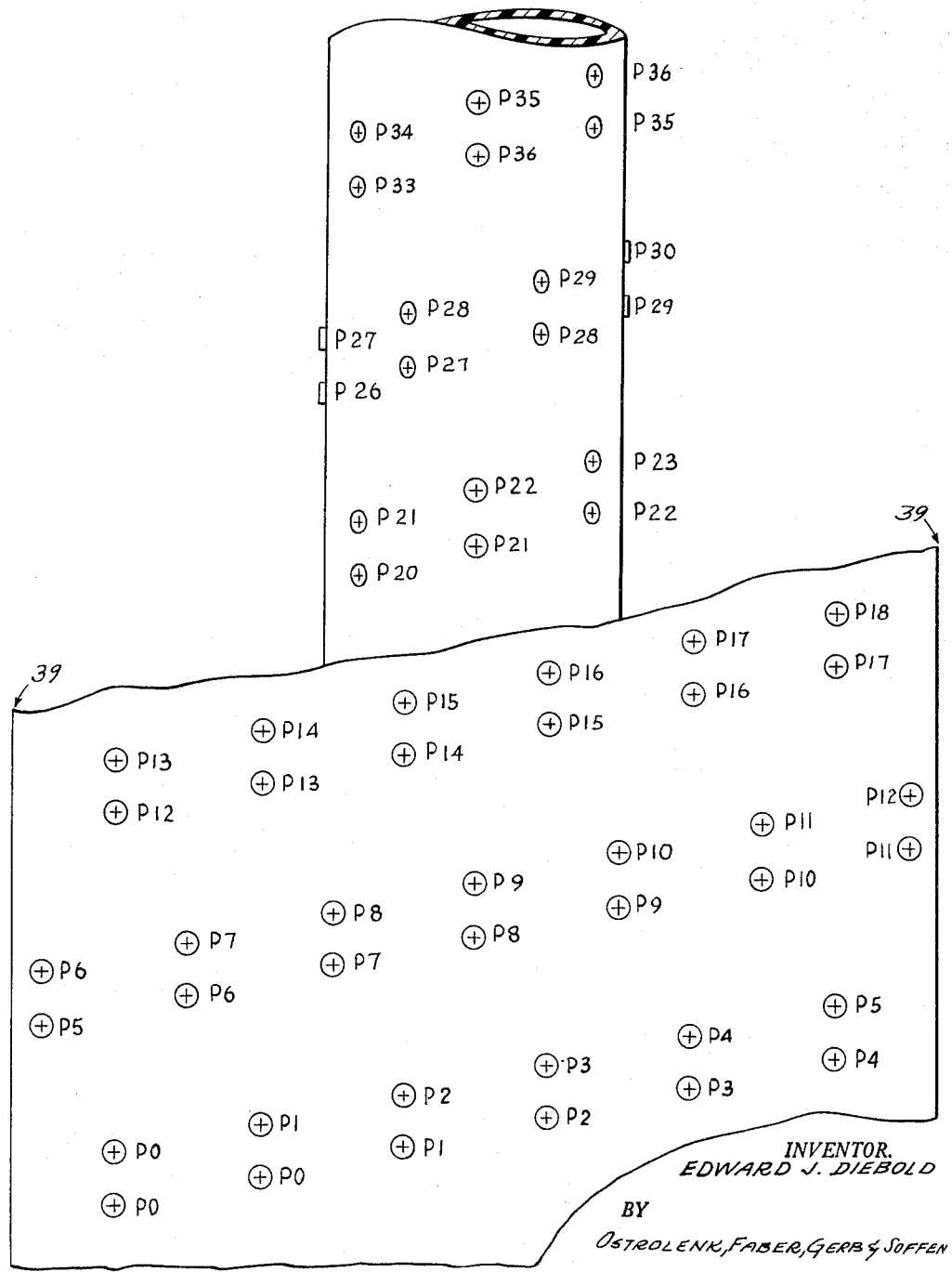
FIGURE 4 is a plan view of the insulating tube which carries the rectifier elements in FIGURE 3 wherein the bottom of the tube is opened out to show the manner in which potential is distributed across the surface of the tube.

Referring now to FIGURE 1, the figure illustrates a complete stack shown as cylinder 10 which has a first spherical end shield 11 which is connected to terminal conductor 12, and a lower spherical end shield 13 which is connected to the terminal connector 14.

In accordance with the present invention and to permit the construction stack 10 to be independent of problems raised by voltages referred to the ground or supporting structure, the complete unit is carried on a single support insulator 16 which is fastened to support structure 17 which could be the floor of a building.

It will be noted that in FIGURE 1 the complete stack 10 is as though it were a complete electrode with respect to support 15, so that the insulation within the stack must maintain only a sufficient insulating level given by the various semi-conductor devices within the stack 10, and the voltages between terminal connectors 12 and 14.

On the other hand, the support insulator 15 may be subjected to transient voltages, test voltages or continuous service voltages which may be five to ten times as high as the insulated level between terminal electrodes 12 and 14. Support insulator 15, however, may be economically formed, according to well-known practices, of a strong ceramic element having surface corrugations, and is especially constructed to serve this insulating function.

It will be noted that the exposed end shields 11 and 13 at either end of the stack 10 are well rounded to avoid corona and other arcing between the stack and its surrounding environment.

In FIGURE 2, I have shown a modification of FIGURE 1 wherein stack 10 and its terminal connectors 12 and 14 and terminal corona shields 11 and 13 are carried by two insulators 24 and 25 which are secured to respective support frame members 26 and 27. Again, insulators 24 and 25 are selected for high voltage insulating levels so that the internal insulation within stack 10 need only support the voltage difference between terminals 12 and 14, and not the voltage between either terminal 12 and frame 26 or terminal 14 and frame 27.

The stack of FIGURES 1 and 2 is shown in plan view in FIGURE 3. The entire stack is mounted on a hollow insulating tube 30 which is cut to any appropriate length. This tube is made of any desired insulating material, and, for example, can be a plastic varnish impregnated fibre tube, or varnish impregnated and baked glass cloth tube.

Individual unitary sub-assemblies of rectifier elements and associated components are then carried directly from tube 30 in a manner to be described hereinafter, such as sub-assemblies 33 through 38. The sub-assemblies are arranged in a helicoidal arrangement which begins with sub-assembly 33, which is connected to end shield 11, and wind down along a helix to sub-assembly 38 which is connected to shield 13.

The devices are electrically connected in series with one another along the helicoidal arrangement so that, for example, assembly 33 will be connected in series with assembly 34 which, in turn, is in series with assembly 35 and so on. The stack in FIGURE 3 will be noted to contain 100 unitary sub-assemblies which are all connected in a long series chain.

From the standpoint of travelling waves, the device from one end shield to the other end shield forms a simple linear arrangement without discontinuities.

The tube 30 of FIGURE 3 is best shown in FIGURE 4 wherein the lower part of the tube is opened outwardly and shows the hole drilling pattern of holes for receiving the rectifier sub-assemblies, illustrates the voltage distribution along the surface of the tube.

In FIGURE 4, numerals P0 through P36 designate potential levels along the chain of semi-conductor devices which are connected in series by connections which extend from screws which are fastened into holes along the tube to support the assembly as well as complete the connection to the next sub-assembly. Thus, each screw (or any other desired fastening means) has a definite potential level, and the tube acts as the insulator between individual semi-conductor devices. The hole drilling pattern determines the pattern of potential distribution which can be directly observed in FIGURE 4.

At the bottom of FIGURE 4, the potential P0 corresponds to the potential of sub-assembly 38 of FIGURE 3 which is directly connected to shield 13. There are three screws at the potential P0 where the lower-most screw corresponds to the shield 13, and the other two screws correspond to the potential of first sub-assembly 38.

A first higher potential level occurs in the next sub-assembly, and is shown as potential P1; and as we progress through the next series connected elements, the potential levels of the connecting screws of the sub-assemblies increase from potential levels P2, P3 and so on until P36 at the top of the figure is reached.

In the upper half of the tube of FIGURE 4 which has not been unwrapped, three turns of the helix are shown, while in the lower half of the figure, it is seen that when the tube is unwrapped (for illustrative purposes, of course) the helix becomes a straight line progression, with the dot-dash line 30 at both sides of the figure designating the rear center of the tube.

Accordingly, it is seen that the potential distribution within the helix is very simple with two screws always being paired having the potential difference of only one sub-unit between them. From one step of the helix to the next step, there is a maximum increase of two units of potential. However, this is over a much greater distance than the distance between paired screws. Thus, the voltage break-down along the surface of the tube is more likely between the two closely associated screws which have only the potential difference of one unit.

In the example of FIGURE 4, if the maximum sub-unit voltage is 600 volts, the surface distance can be .15 inch, corresponding to a surface gradient of .25 kilovolt per inch.

Between the turns of the helix, the position of the sub-assemblies are off-set by ½ of a position corresponding to 6½ devices per turn so that the helix progresses by 13 full devices for two turns. Because the potential increases from device to device, and from turn to turn, the potential increases from one turn to the next turn which corresponds to either 5 devices or 6 devices in series.

The distance along the surface of the tube for voltages between adjacent turns is the shortest between positions corresponding to five device voltages in series which would correspond to 3 kilovolts (for 600 volt devices). This voltage appears over a distance in a preferred embodiment of 1.03 inches which is approximately 2.9 kilovolts per inch. For other adjacent points between turns where the devices are separated by 6 sub-units, there is a slightly longer distance of 1.2 inches so that the total voltage of 3.6 kilovolts will still yield the same average gradient of 2.9 kilovolts per inch. Note that these gradients are very safe for indoor application in a clean atmosphere particularly because the buildup of the gradient is gradual.

If the upper row of the first turn of the helix formed by P0 through P5 is compared with the lower row consisting of P5 through P11 of the next higher turn, it will be seen that there is a steady increase of potential between the lower and upper turn with the same difference of potential and the same gradient between the two. Thus, the electric lines of force will be practically parallel and the equipotential lines are also parallel.

Each position of potential also shields the succeeding position to form an equal potential distribution along the complete length of the tube in which the lines of force are parallel to the axis of the tube and the equipotential lines are roughly circumferential with respect to the tube. This type of arrangement permits a gradually increasing potential and equally distributed potential along the full length of the tube to substantially eliminate the possibility of localized high voltage for high gradient which would lead to a local break-down. This factor is of great importance in that, by a simple means, standard hardware and a simple insulating tube can be used in supporting the various rectifier sub-assemblies which are to be connected in series. This is to be contrasted with the previously required very sophisticated construction needed in the series connection of the various elements to prevent high local gradients.

Typical of the allowable simple hardware which can be used with the tube of FIGURE 4 is the manner in which the openings in the wall of the tube of FIGURE 4 may be adapted to receive screws. This is shown in FIGURE 5 for one of the openings wherein the wall of tube 30 receives a riveted insert 41 which can receive a mounting screw. The insert 41 is initially a tubular element having a flange which is inserted into a through hole in the wall of tube 30 and then riveted by pulling the left-hand end of insert 41 to the right to form bulge 46 which holds the rivet firmly in the hole in connection with its flanged top 46a.

Once the threaded inserts 41 are in place, elements 42 and 43 which are integral components of the rectifier sub-assembly to be described and a self-locking washer 44 may be connected together by screw 45 which is tightened into the threaded opening of insert 41 to achieve both electrical connection and mechanical support at one and the same time.

A first embodiment of the sub-assembly construction of the sub-assembly to be supported on insulator tube 30 is shown in FIGURES 6, 7 and 8. In FIGURES 6, 7 and 8 it is presumed that the holes have been drilled in tube 30 according to the pattern shown in FIGURE 4, and that the riveted inserts such as 41 have been provided for each of the holes.

Each of the individual sub-assemblies is comprised of a stamped and pressed U-shaped bracket 46 specifically shown in FIGURE 6A. Bracket 46 is provided with a dimple 46a which receives rectifier device 47 in electrical and mechanical engagement.

More specifically, a steel insert 48 of FIGURES 7 and 8 is brazed within dimple 46a. Insert 48 has a circular welding protrusion (not shown) directed toward the securing flange on cell 47 and is welded as by a circular spot-weld to the cell. This method of fastening is advantageous in that the insert material of insert 48 may be selected to match the casing material of cell 47 and can be firmly affixed to bracket 46 by brazing with a suitable alloy which matches both the insert 48 and bracket 46.

Bracket 46 has a first and second support tab 46b and 46c respectively (where tab 46c corresponds to element 42 of FIGURE 5). Each of tabs 46b and 46c have openings therein for permitting securing to a respective rivet such as rivet 41 at FIGURE 5 by a screw such as screw 45 of FIGURE 5.

In FIGURE 8 it will be noted that both of tabs 46b and 46c will each be at potential P2 where potential P2 is the potential of the bracket 46. The bracket corresponding to potential P1 is shown in dotted outline in FIGURE 6 as including element 50a, while the bracket at potential P3 is illustrated in dotted lines by element 50b.

The outer side of bracket 46 which is away from the support tube 30 has an extending surface 46d which is slightly curved and is spot-welded or brazed to conductive shield 50. This shield, as well as the bracket 46, is made of copper or any other highly conductive material, and acts both as a shield and as a cooling fin for the cell 47 and the sub-assembly.

It will now be understood that in FIGURE 3 the external elements of the sub-assemblies 33 through 38 are the external shields. The shape of the shield 50, as seen in FIGURE 8, is determined by the space requirements to fit the shields together in the helix to form a closely spaced group without protrusions or sharp corners. Note that both the shield 50 and bracket 46 are easily manufactured components which may be stamped or pressed and spot-welded or brazed together.

The rectifying element 47 in a similar manner is assembled by a spot-welding operation whereby the entire sub-assembly, although it has many functions and is economically manufactured, lends itself to mass production techniques.

As will be seen hereinafter, the shields which are curved and rimmed to prevent flash-over are sufficiently spaced from one another to permit access to the mounting screws.

The anode of the rectifying element or cell 47 is connected to an anode connector or conductive strap 49 which connects the anode of cell 47 to the mounting screw of the adjacent sub-assembly which operates at potential level P3 in the manner best shown in FIGURE 6. This electrical connector has a low resistance and a low A.-C. impedance. Therefore, a travelling wave which comes from potential P1 will go through the short connectors which are clearly defined and identical for all of the devices in the stack.

Although not shown in FIGURES 6, 7 and 8, the sub-assembly may further include a small resistor and capacitor connected in parallel with cell 47 as by being connected from anode connector 49 to the cathode of the cell 47 which is at the potential of bracket 46. These devices may also be soldered directly across two adjacent brackets which may have small connection protrusions for this purpose.

FIGURE 9 best illustrates the manner in which the assembly mounting screws are externally accessible from the outside of a stack. Thus, in FIGURE 9 which is similar to FIGURE 3, but eliminates many of the turns of the helix, sub-assemblies 63 and 64, by way of example, have their right and left-hand bracket ends respectively secured by screws 65 and 66. The external shields of sub-assemblies 63 and 64 are sufficiently spaced from one another to permit access to screws 65 and 66 by a standard screwdriver.

It will also be noted in FIGURE 9 that the end shields 11 and 13 are formed to fit the individual shields of the sub-assemblies at the last turn at either end of the helix.

A second embodiment of the sub-assembly structure is shown in FIGURES 10, 11 and 12 wherein rectifier elements 70 have a larger current rating than do the rectifier elements of the embodiment of FIGURES 6, 7 and 8.

Referring now to FIGURES 10, 11 and 12, the rectifier element 70 is terminated with a threaded cathode.

The threaded cathode is received by an opening in the bottom of bracket 71 which, in all other respects, is identical to bracket 46 of FIGURE 6A. The threaded cathode 70a is then rigidly secured with respect to bracket 71 as by nut and washer 74 and 75 respectively.

FIGURES 10, 11 and 12 further illustrate the manner in which shunt resistors 72 are carried in the sub-assembly. Thus, resistor 72 has one lead 72a soldered to bracket 71 as by providing a small aperture (see FIGURE 12) in the bracket 71 for receiving lead 72a. The anode conductor 73 has the other lead 72b of resistor 72 soldered thereto where again anode conductor 73 may have an opening therein for receiving lead 72b. A capacitor which may be a small ceramic capacitor is also mounted between the same terminal points as is resistor 72, as is schematically illustrated in FIGURE 11 by capacitor 72c.

It will also be observed with particular reference to FIGURE 12 that the anode conductor 73 is secured to the anode of rectifier 73 by a screw 76 which is terminated by a nut 77, whereas a soldered connection is used in the lower rated type of device.

FIGURES 10, 11 and 12 clearly show how the various parts required for the high voltage rectifier stack and the associated hardware and by-pass resistor and capacitor are contained behind the electrostatic shield 79. Only the shields 70 are exposed to the external portions of the stack as is shown in FIGURE 10. Thus, the stack has a cylindrical, smooth appearance except for the rounded ends of the individual shields to form a cylinder which is an ideal shape for high voltage devices. With the rounded end electrodes such as end shields 11 and 13 of FIGURE 7, the entire stack has a theoretically ideal shape from the standpoint of electrical stress applied to the stack from the outside.

The manufacture of the sub-assemblies of the embodiments of either FIGURE 6 or FIGURE 10 may be performed on a jig which has screw fastenings at the exact angle and distance as the final cylinder so that all of the brackets and anode connectors have identically the same shape and are exactly located with respect to the shield so that all of the sub-assemblies are identical in shape and dimension. A similar jig may be used for quality control whereby individual assemblies are checked simultaneously for mechanical dimensions, forward characteristics of the rectifying devices, reverse characteristics of the rectifying device and testing of the by-pass capacitor and by-pass resistor. Such a test jig may be provided with automatic clamping devices simulating the fastening screws such as fastening screws 45 to permit semi-automatic testing requiring only the insertion of the sub-assembly to achieve a full test for all mechanical and electrical quantities which are required for each sub-assembly.

Thus, mass production techniques assure not only economical manufacture, but guarantee consistent performance for all of the various sub-assemblies to be used in a high voltage stack. This uniformity will assure good performance and high reliability for the entire stack.

Where forced cooling of the stack is required, the entire stack may be immersed in a vertical or axial air-blast which is applied to the stack by a blower which is at a safe distance from the stack at ground potential. If necessary, circular air guides can be arranged at a safe distance from the stack to guide air without endangering the insulating properties of the assembly. Furthermore, for the purposes of cooling, the rectifier stacks of the present invention can be submerged in a liquid insulating media such as oil. One advantage of liquid immersion for the type of stack proposed in the instant invention is that the tank can be built relatively close to the shield surfaces without danger of break-down.

Where extremely high voltage applications are required, it may be desirable that a helix-shaped resistive voltage shield be mounted concentric with the rectifier stack and connected in parallel thereto.

By way of example, where the stack is mounted within a coaxially arranged insulating tube, the interior portion of the tube may be metallized with a high resistance coating which is equi-distant from, and equal in width to, the helix formed by the shields of the individual sub-assemblies. Thus, there will be two helixes which are parallel and coaxial, one formed by a resistive coating and the other formed by the rectifying devices.

Such a construction is set forth in FIGURE 13 wherein an extremely high voltage rectifier stack is formed of stack elements 80, 81 and 82 which are similar, for example, to the stack of FIGURE 3 and are contained within the insulating tube 83. The interior of the tube 83 has a metallized high resistance coating 83a in a helicoidal form which is arranged to have its convolutions parallel to the convolution of the helix formed by the rectifier assemblies of stacks 80, 81 and 82.

The voltage field between these two helixes is parallel with an equal voltage difference between each of the individual shields of the rectifier assemblies and the opposed part of the outer helix. This system will be particularly advantageous where travelling wave equalization is a problem, or extremely high voltages are encountered which endanger the performance of the stack due to unequal systematic capacitances.

With the proposed structure of the invention, the capacitance problem is referred to the resistive voltage shield formed by the outer helix 83a which is a problem of lesser magnitude than for the rectifier stack itself.

The use of the resistive helix shield 83a is particularly advantageous where many high voltage rectifier stacks are placed in liquid, and crowded closely together. The unequal voltage distribution and unequal voltage gradients then occur between the outer faces of the resistive shields and not between individual rectifier stacks which relieves the individual rectifying devices from excessive voltages produced by unequal voltage distributions occurring due to the external electric field.

In FIGURE 13 the individual rectifier stacks 80, 81 and 82 are carried in any desired manner within tube 83 as by providing spaces 84, 85, 86 and 87 which rigidly position and maintain the individual rectifier stacks in position within tube 83. These spacers 84 through 87 preferably have apertures therein as by forming the spacers like a spoked wheel to permit the flow of cooling fluid through the stack.

The resistive material forming coating 83a which is to be connected in parallel with rectifier stacks 80, 81 and 82 may be so connected by causing spacers 84 through 87 to act as contacts between the rectifier stacks and the resistive shield.

A rounded top electrode 88 is then affixed to the stack to prevent corona or flash-over from the upper high voltage end of the stack to ground. The other end of the stack is insulated from ground by any desired insulating method such as the use of ceramic insulator 89.

Insulator 89 is hollow and is arranged to be supported from lower casing 90 which contains a blower schematically illustrated as blower 91. In operation, the blower 91 will drive air upwardly and out in the direction of arrow 92 at the top of the stack so that the entire rectifier stack and the resistive shield is cooled in a highly desired manner.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. A high voltage rectifier stack; said high voltage rectifier stack comprising a plurality of individual cells connected in series with one another; each of said individual cells being supported on a common insulation member; said high voltage rectifier stack having a terminal conductor at either end thereof; and support means for supporting said stack from a grounded support structure; said support means being mechanically connected to said stack and having an insulating level sufficient to withstand high instantaneous transient voltages between either of said terminal conductors and said grounded support.

2. A high voltage rectifier stack; said high voltage rectifier stack comprising a plurality of individual cells connected in series with one another; each of said individual cells being supported on a common insulation member; said high voltage rectifier stack having a terminal conductor at either end thereof; and support means for supporting said stack from a grounded support structure; said support means being mechanically connected to said stack and having an insulating level sufficient to withstand high instantaneous transient voltages between either of said terminal conductors and said grounded support; said high voltage rectifier stack acting as a single electrode with respect to said grounded support structure.

3. A high voltage rectifier stack; said high voltage rectifier stack comprising a plurality of individual cells connected in series with one another; each of said individual cells being supported on a common insulation member; said high voltage rectifier stack having a terminal conductor at either end thereof; and support means for supporting said stack from a grounded support structure; said support means being mechanically connected to said stack and having an insulating level sufficient to withstand high instantaneous transient voltages between either of said terminal conductors and said grounded support; said support means comprising a corrugated ceramic insulator.

4. A support for a plurality of semi-conductor elements electrically related with respect to one another; each of said semiconductor elements including respective housing members; said support comprising an elongated member of insulation material; said semi-conductor elements being mechanically connected to the external surface of said elongated member of insulation material; said semi-conductor elements defining a helix around said external surface of said elongated member of insulation material; each of said semi-conductor elements being covered by a respective shield member; each of said shield members being at the potential of one of the terminals of its respective semi-conductor element; said external shield members defining a smooth outer helicoidal surface winding around said elongated member of insulation material.

5. A support for a plurality of semi-conductor elements electrically related with respect to one another; said support comprising an elongated member of insulation material; said semi-conductor elements being mechanicallly connected to the external surface of said elongated member of insulation material; said semi-conductor elements defining a helix around said external surface of said elongated member of insulation material; a fastening means for each of said semi-conductor elements; said fastening means mechanically connecting its said respective semi-conductor element to said elongated support member; said fastening means electrically connecting its respective semi-conductor element in electrical series with respect to an adjacent semi-conductor element of said helix.

6. A support for a plurality of semi-conductor elements electrically related with respect to one another; said support comprising an elongated tubular member of insulation material; said semi-conductor elements being mechanically connected to the external surface of said elongated member of insulation material; said semi-conductor elements defining a helix around said external surface of said elongated member of insulation material; the potential gradient along the surface of said elongated support member being relatively constant in an axial direction.

7. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said support frame of an adjacent sub-assembly to electrically connect said plurality of sub-assemblies in electrical series.

8. In combination for a high voltage rectifier stack; an elongated support member of insulation material and a plurality of sub-assemblies including a respective rectifiber element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series.

9. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; each of said sub-assemblies having a conductive shield member electrically and mechanically connected by their said support frame to present a flat, smooth contour to areas external to said sub-assemblies.

10. In combination for a high voltage rectifier stack; an elongated support member of insulation material and a plurality of sub-assemblies including a respective rectifier element to be carried by said elongated member; each of said plurality of sub-assemblies including a support frame, a shunt resistor and shunt capacitor for said respective rectifier element, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to said support frame of an adjacent subassembly to electrically connect said plurality of sub-assemblies in electrical series.

11. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; each of said sub-assemblies having a conductive shield member electrically and mechanically connected by their said support frame to present a flat, smooth contour to areas external to said sub-assembly; said continuous progression of sub-assemblies comprising a helix.

12. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; each of said sub-assemblies having a conductive shield member electrically and mechanically connected by their said support frame to present a flat, smooth contour to areas external to said sub-assembliy; said shield of said sub-assemblies being spaced with respect to one another; said connecting portion of each of said support frames being accessible through the said space between said shields.

13. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; the potential gradient along the surface of said elongated support member being relatively constant in an axial direction.

14. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; each of said sub-assemblies having a conductive shield member electrically and mechanically connected by their said support frame to present a flat, smooth contour to areas external to said sub-assembly; and a housing surrounding said stack; said housing having an internal coating of resistive material parallel to said continuous progression defined by said shields of said sub-assemblies; said resistive coating being connected in parallel with said stack.

15. In combination for a high voltage rectifier stack; an elongated support member of insulation material and a plurality of sub-assemblies including a respective rectifier element to be carried by said elongated member; each of said plurality of sub-assemblies including a support frame, and said respective rectifier element; each of said support frames being of electrically conductive material and being electrically connected to one terminal of its said respective rectifier element; each of said support frames having a connection portion operable to be mechanically connected to said elongated support element; each of said rectifier elements having a conductor extending from its other terminal; each of said sub-assemblies being mounted on said surface of said elongated support member to define a continuous progression of sub-assemblies from one end of said support member to the opposite end of said support member; said conductor extending from said other terminal of said rectifier elements being electrically connected to the said connection portion of the support frame of an adjacent sub-assembly to electrically connect said plurality of sub-assemblies in electrical series; each of said sub-assemblies having a conductive shield member electrically and mechanically connected by their said support frame to present a flat, smooth contour to areas external to said sub-assembly; and a housing surrounding said stack; said housing having an internal coating of resistive material parallel to said continuous progression defined by said shields of said subassemblies; said resistive coating being connected in parallel with said stack; said housing defining a passage for a cooling medium for cooling said stack.

16. The device substantially as set forth in claim 4 which further includes first and second conductive end portions; said first and second end portions being electrically connected at the respective ends of said helicoidal surface winding; said end portions being substantially perpendicular to the axis of said helicoidal winding and having smooth outer faces.

17. The device substantially as set forth in claim 4 wherein each of said external shield members are formed of a generally rectangularly shaped member; each of said external shield members being separated from any of their adjacent shield members by a relatively constant distance, thereby forming an effectively continuous shielding cylinder.

18. A support for a plurality of electrical elements which are connected in series with one another; said support comprising an elongated member of insulation material; said electrical elements being mechanically connected to the external surface of said elongated member of insulation material; said electrical elements defining a helix around said external surface of said elongated member of insulation material; shield members for each of said electrical elements; each of said electrical elements being covered by its said respective shield member; each of said shield members being at the potential of one of the terminals of its respective electrical element; said external shield members defining a smooth outer helicoidal surface winding around said elongated member of insulation material; and a first and second conductive end portion; said first and second conductive end portions being electrically connected to the respective ends of said helicoidal surface winding; said end portions being substantially perpendicular to the axis of said helicoidal winding and having smooth outer surface.

References Cited by the Examiner

UNITED STATES PATENTS

| 1,824,716 | 1/32 | Ferranti | 317—234 |
| 2,143,919 | 1/39 | Kotterman | 317—234 |
| 2,279,101 | 4/42 | Alriq | 317—234 |
| 2,412,989 | 12/46 | Kotterman | 317—234 |
| 2,430,904 | 11/47 | Boldingh | 317—234 |
| 2,980,828 | 4/61 | Eggers | 317—234 |
| 2,984,773 | 5/61 | Guldemond et al. | 317—234 |
| 2,999,971 | 9/61 | Schenecke | 317—100 |

JOHN F. BURNS, *Primary Examiner.*

SAMUEL BERNSTEIN, *Examiner.*